(12) United States Patent
Porte et al.

(10) Patent No.: US 11,731,381 B2
(45) Date of Patent: Aug. 22, 2023

(54) METHOD FOR MANUFACTURING TWO SOUNDPROOF PANELS IN THE SAME MOLD USING TWO MOLD CAVITIES

(71) Applicant: Airbus Operations SAS, Toulouse (FR)

(72) Inventors: Alain Porte, Colomiers (FR); Jacques Lalane, Saint Orens de Gameville (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 580 days.

(21) Appl. No.: 16/580,942

(22) Filed: Sep. 24, 2019

(65) Prior Publication Data
US 2020/0101643 A1 Apr. 2, 2020

(30) Foreign Application Priority Data
Sep. 28, 2018 (FR) ...................................... 1858999

(51) Int. Cl.
*B29D 99/00* (2010.01)
*B29C 33/00* (2006.01)
*B29C 33/42* (2006.01)
*F02C 7/24* (2006.01)
*B29C 70/30* (2006.01)
*B29L 31/30* (2006.01)

(52) U.S. Cl.
CPC ...... *B29D 99/0021* (2013.01); *B29C 33/0022* (2013.01); *B29C 33/42* (2013.01); *B29C 70/30* (2013.01); *F02C 7/24* (2013.01); *B29D 99/001* (2013.01); *B29L 2031/3076* (2013.01)

(58) Field of Classification Search
CPC ..... B29C 33/0022; B29C 33/42; B29C 70/30; B64C 1/40; B29D 99/001; B29D 99/0021; B64F 5/10; F02C 7/24; B29L 2031/3076; B32B 3/12; Y02T 50/40
See application file for complete search history.

(56) References Cited

U.S. PATENT DOCUMENTS

2010/0080980 A1 4/2010 Maheshwari et al.
2011/0297325 A1* 12/2011 Maheshwari ......... B29C 70/549
156/500

(Continued)

FOREIGN PATENT DOCUMENTS

JP 2002321238 A 11/2002

OTHER PUBLICATIONS

Wikipedia, Acoustic liner, Accessed Oct. 14, 2022, Wikipedia, url: https://en.wikipedia.org/wiki/Acoustic_liner (Year: 2022).*
French Search Report; priority document.

*Primary Examiner* — Francisco W Tschen
*Assistant Examiner* — Elisa H Vera
(74) *Attorney, Agent, or Firm* — Greer, Burns & Crain, Ltd.

(57) ABSTRACT

A method for manufacturing two soundproof panels of an aircraft nacelle including a duct. The manufacturing method includes a step of supplying a mold having, on a single face, a cavity for each soundproof panel, a step of producing, in the bottom of each cavity, an inner skin for being oriented towards the duct, and a curing step during which the elements present in the mold are cured in the mold. Such a method makes it possible to produce the two soundproof panels in the same mold, thus reducing the gaps between them after they have been positioned.

7 Claims, 2 Drawing Sheets

(56) References Cited

U.S. PATENT DOCUMENTS

| | | | | |
|---|---|---|---|---|
| 2013/0133977 A1* | 5/2013 | Hurlin | ........................ | F02K 1/44 |
| | | | | 181/288 |
| 2013/0320142 A1* | 12/2013 | Nordman | .............. | B29C 65/483 |
| | | | | 244/123.5 |
| 2015/0314489 A1* | 11/2015 | Vauchel | .................. | B29C 70/30 |
| | | | | 264/313 |
| 2017/0259251 A1* | 9/2017 | Lee | ........................ | B01J 29/7846 |
| 2018/0297304 A1* | 10/2018 | Weaver | ................. | B29C 66/472 |

* cited by examiner

METHOD FOR MANUFACTURING TWO SOUNDPROOF PANELS IN THE SAME MOLD USING TWO MOLD CAVITIES

CROSS-REFERENCES TO RELATED APPLICATIONS

This application claims the benefit of the French patent application No. 1858999 filed on Sep. 28, 2018, the entire disclosures of which are incorporated herein by way of reference.

FIELD OF THE INVENTION

The present invention relates to a method for manufacturing two soundproof panels for an aircraft powerplant, a mold for implementing such a method, a powerplant using soundproof panels obtained using such a method and an aircraft including at least one such powerplant.

BACKGROUND OF THE INVENTION

An aircraft turboshaft engine includes a nacelle that has an air intake structure at the front provided with a lip that defines the inside and the outside of the nacelle. The lip is extended towards the inside of the nacelle by a wall that is arranged around a duct that channels the air towards the engine including, inter alia, a fan.

The wall is provided, in particular, with soundproof panels that attenuate the noise generated by the engine.

The use of two soundproof panels that are arranged one behind the other relative to the direction of flow of the air in the duct is known from the prior art. FIG. 5 shows such an installation 400 of the prior art.

A first soundproof panel 402, known as an acoustic panel, the front portion of which is fastened to the lip and the rear portion of which is fastened to a coupling flange 404.

A second soundproof panel 406 is situated just in front of the blades of the turboshaft engine and inside the fan casing. The front portion of the second soundproof panel 406 is arranged behind the first soundproof panel 402 and is fastened to the coupling flange 404.

Although such an architecture gives good results, the fact that these two soundproof panels are produced separately from each other results in the occurrence of radial misalignment between the two soundproof panels and therefore a step that generates aerodynamic interference and increased drag.

In addition, a gap parallel to the longitudinal axis of the turboshaft engine can appear due to the architecture of the connection between the two soundproof panels.

SUMMARY OF THE INVENTION

An object of the present invention is to propose a method for manufacturing two soundproof panels for an aircraft engine that makes it possible to eliminate the radial misalignment and gap between the two soundproof panels.

To this end, a method is proposed for manufacturing two soundproof panels of an aircraft nacelle including a duct in which each soundproof panel includes an inner skin for being oriented towards the duct, the manufacturing method including:

a step of supplying a mold having, on a single face, a cavity for each soundproof panel, a step of producing an inner skin in the bottom of each cavity, and a step of curing during which the elements present in the mold are cured in the mold.

Such a method makes it possible to produce the two soundproof panels in the same mold, thus reducing the gaps between them after they have been positioned.

According to a particular embodiment, between the production step and the curing step, the method includes a step of positioning a honeycomb web on top of each inner skin and then a step of positioning an outer panel on top of each web.

According to a particular embodiment, the manufacturing method includes, after the curing step, a step of positioning a honeycomb web on top of each inner skin and then a step of positioning an outer panel on top of each web.

The invention also proposes a mold for producing two soundproof panels of an aircraft nacelle including a duct in which each soundproof panel includes an inner skin for being oriented towards the duct, in which the mold has, on a single face, a cavity for each soundproof panel, in which the bottom of each cavity shapes the surface of the inner skin.

The invention also proposes an aircraft powerplant including a nacelle with a duct and two soundproof panels produced by the method according to one of the previous variants.

The invention also proposes an aircraft including at least one powerplant according to the previous variant.

BRIEF DESCRIPTION OF THE DRAWINGS

The aforementioned features of the invention, along with others, will become more apparent on reading the following description of an embodiment, said description being given with reference to the attached drawings, in which.

DETAILED DESCRIPTION OF THE PREFERRED EMBODIMENTS

Figure 1:
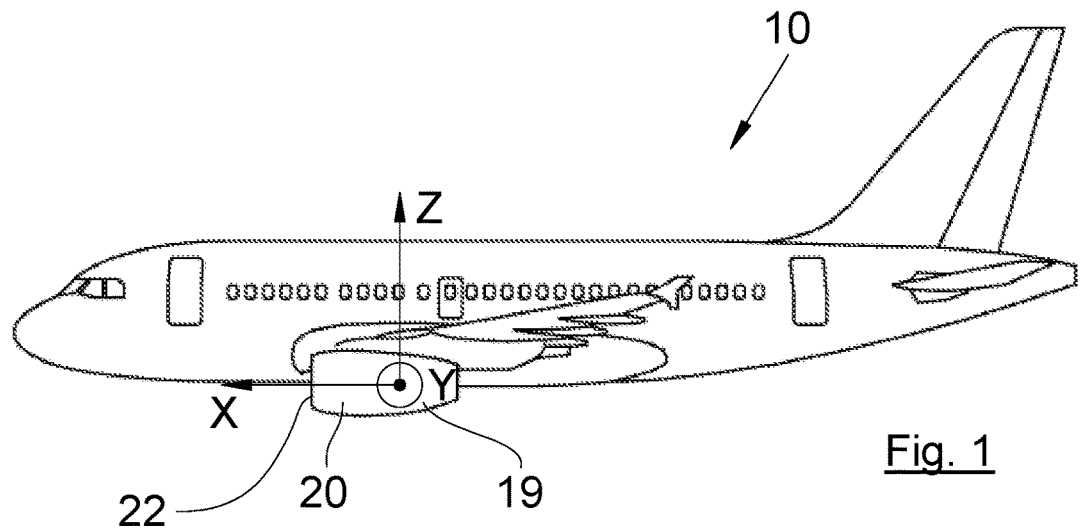
FIG. 1 shows a side view of an aircraft according to the invention.

In the following description, terms relating to position are given with reference to an aircraft in a position of forward travel, i.e., as shown in FIG. 1.

FIG. 1 shows an aircraft 10 that includes at least one turboshaft engine 20.

Throughout the following description, by convention, the direction X corresponds to the longitudinal direction of the turboshaft engine 20, this direction being parallel to the longitudinal axis X of the turboshaft engine 20. In addition, the direction Y corresponds to the direction oriented transversely relative to the turboshaft engine 20, and the direction Z corresponds to the vertical direction or height, these three directions X, Y, Z being orthogonal to each other.

Figure 2:
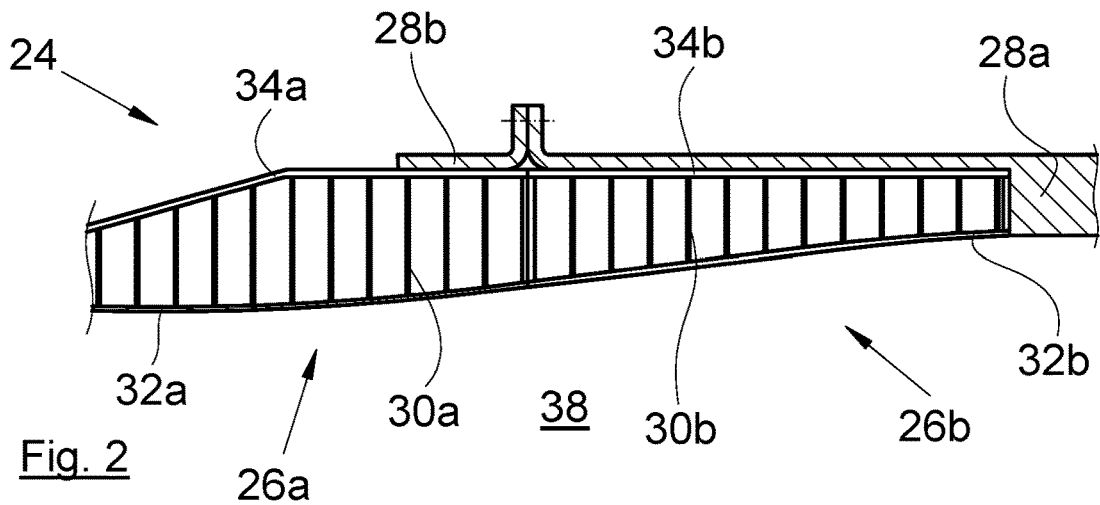
FIG. 2 is a cross-sectional side view of a detail of a turboshaft engine according to the invention.

The turboshaft engine 20 conventionally includes a nacelle 19 that includes an air intake structure 22 including an inner structure 24 (FIG. 2).

FIG. 2 shows a cross-section of the inner structure 24 that enables acoustic treatment. The inner structure 24 is arranged around a duct 38 that channels the air towards an engine that includes, inter alia, a fan.

The inner structure 24 successively includes two soundproof panels 26a and 26b that are fastened to a structure 28a, 28b of the nacelle 19. The fastening of the two soundproof panels 26a and 26b is not described in more detail and uses, for example, the same elements as for a turboshaft engine of the prior art.

Each soundproof panel 26a, 26b takes the form of a multi-layer structure that has a honeycomb web 30a, 30b that is fastened between an inner skin 32a, 32b oriented towards the duct 38 and an outer panel 34a, 34b oriented in the opposite direction. Each soundproof panel 26a, 26b has a contact surface that is in contact with the contact surface of the other soundproof panel 26b, 26a.

Each inner skin 32a, 32b is porous, allowing sound waves to propagate in the web 30a, 30b for attenuation therein. The porosity is achieved, for example, by holes (not shown) passing through each inner skin 32a, 32b.

Figure 3:
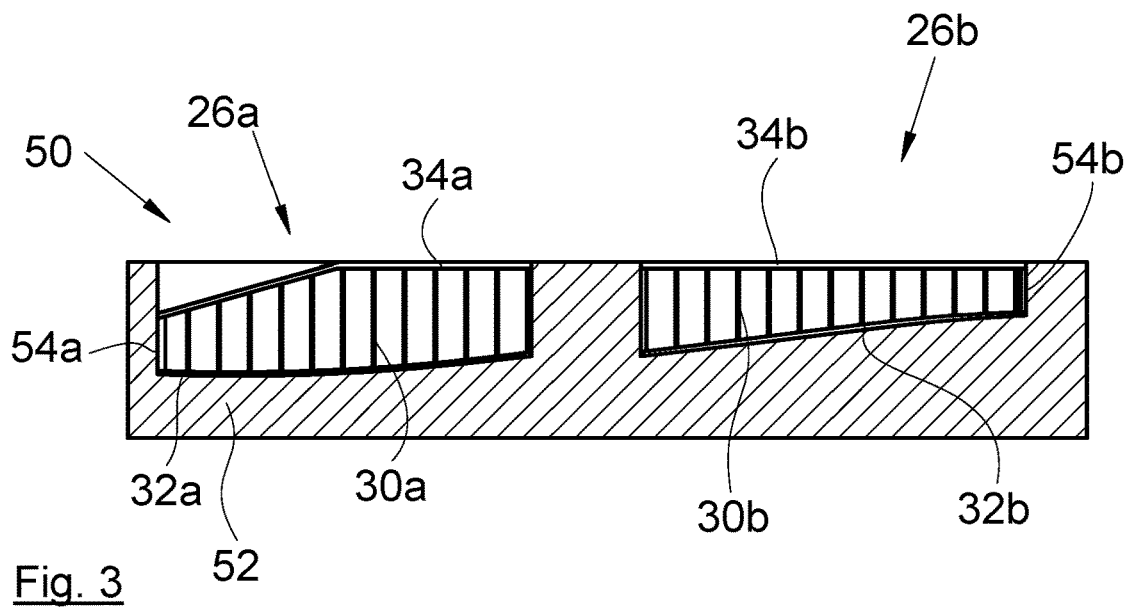
FIG. 3 is a diagrammatic representation of a fixture enabling the implementation of a manufacturing method according to a first embodiment of the invention.

FIG. 3 shows a fixture 50 according to a first embodiment of the invention that includes a mold 52 having, on a single face, a cavity 54a, 54b for each soundproof panel 26a, 26b. Each cavity 54a, 54b is open on the same face.

The bottom of each cavity 54a, 54b is configured to mold the inner skin 32a, 32b of the associated soundproof panel 26a, 26b. Thus, the two inner skins 32a, 32b of the two soundproof panels 26a, 26b are produced in the same mold 52, which prevents the combining of tolerances when different molds are used. The two cavities 54a and 54b are machined during the same process by the same machine, which can keep the same reference throughout the machining process. After assembly of the two soundproof panels 26a and 26b, the gaps between them are reduced compared to those of the soundproof panels of the prior art. In addition, the use of a single mold 52 makes it possible to apply the same curing cycle for both soundproof panels 26a, 26b.

For each cavity 54a, 54b, the bottom of the cavity 54a, 54b shapes the surface of the inner skin 32a, 32b, the surface being the one oriented towards the duct 38.

Each inner skin 32a, 32b is conventionally produced by placing in the bottom of the cavity 54a, 54b layers of material, particularly composites, which are thus molded in the cavities 54a, 54b.

The web 30a, 30b is then placed on the corresponding inner skin 32a, 32b, and each outer panel 34a, 34b is then placed on the associated web 30a, 30b.

Each assembly produced in this way is then cured so that it takes its final form. The curing step preferably takes place in a vacuum that is created by a vacuum circuit common to the two cavities 54a, 54b. The vacuum is created, for example, by positioning a matching mold that closes off the two cavities 54a, 54b.

According to another embodiment, the inner skins 32a, 32b are cured simultaneously in the mold 52, while the webs 30a, 30b and the outer panels 34a, 34b are cured separately and fastened subsequently.

The method according to the invention for manufacturing the two soundproof panels 26a and 26b includes:

a supply step during which the mold 52 having one cavity 54a, 54b for each soundproof panel 26a, 26b is supplied, a production step during which, in the bottom of each cavity 54a, 54b, an inner skin 32a, 32b is produced, and a curing step during which the elements present in the mold 52 are cured in the mold 52.

According to the embodiment implemented, the elements that undergo the curing step are the inner skins 32a, 32b, the webs 30a, 30b and the outer panels 34a, 34b, or the inner skins 32a, 32b only.

According to a particular embodiment, between the production step and the curing step, the method includes a step of positioning a honeycomb web 30a, 30b on top of each inner skin 32a, 32b and then a step of positioning an outer panel 34a, 34b on top of each web 30a, 30b. The webs 30a, 30b and the outer panels 34a, 34b are thus fastened before curing.

According to another particular embodiment, after the curing step, the method includes a step of positioning a honeycomb web 30a, 30b on top of each inner skin 32a, 32b and then a step of positioning an outer panel 34a, 34b on top of each web 30a, 30b. The webs 30a, 30b and the outer panels 34a, 34b are thus fastened after curing.

Holes may be made in each inner skin 32a, 32b before or after the manufacturing of the soundproof panel 26a, 26b.

Figure 4:
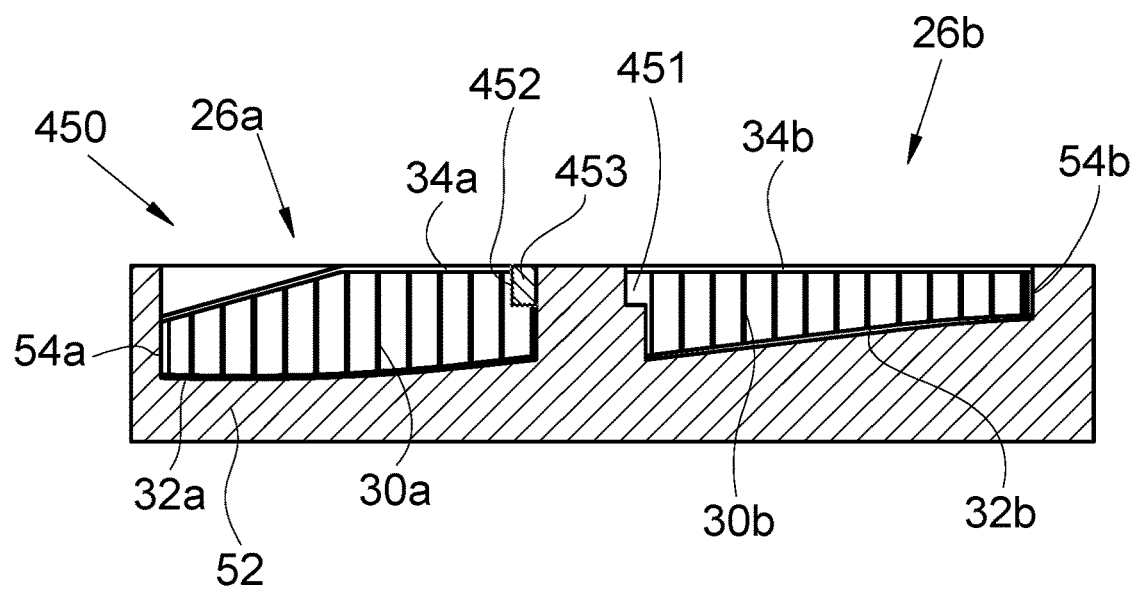
FIG. 4 is a diagrammatic representation of a fixture enabling the implementation of a manufacturing method according to a second embodiment of the invention.
Figure 5:
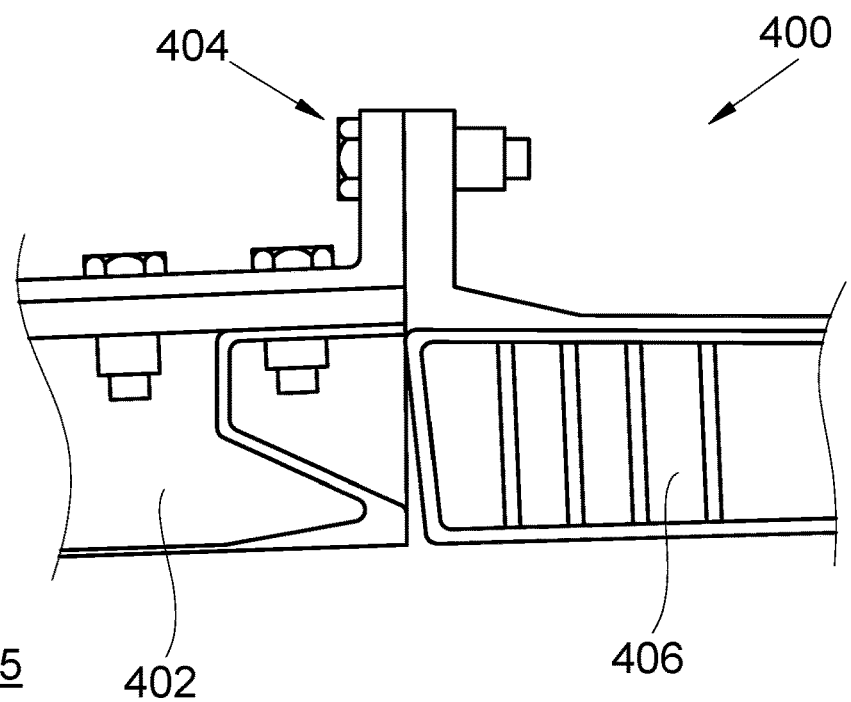
FIG. 5 shows a side view of soundproof panels according to the prior art.

FIG. 4 shows a fixture 450 according to a second embodiment of the invention. The difference between the fixture 50 of the first embodiment and the fixture 450 of the second embodiment lies in the fact that the contact surfaces of the two soundproof panels 26a and 26b are not flat in the second embodiment.

Thus, in the embodiment in FIG. 4, the contact surface of the soundproof panel 26a has a recess 452 on its upper portion and the contact surface of the soundproof panel 26b has a protrusion 451 that is intended to be accommodated in the recess 452 when the two soundproof panels 26a and 26b are positioned.

In order to produce the recess 452 during the production of the soundproof panel 26a, the mold 52 includes a mold release insert 453 that is fastened in the cavity 54a instead and in place of the recess 452 and is removable to enable the soundproof panel 26a to be released from the mold.

The invention is more particularly described in the context of a turboshaft engine, but it applies in the same way to all types of powerplants for an aircraft 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing two soundproof panels of a nacelle of an aircraft, the nacelle including a duct, wherein each soundproof panel includes a radially innermost skin oriented towards the duct, the manufacturing method comprising:

supplying a mold having, on a single face, a first cavity and a second cavity in which first and second soundproof panels are produced, each of the first and second cavities having a sidewall, producing a first radially innermost skin of the first soundproof panel in a bottom of the first cavity, producing a second radially innermost skin of the second soundproof panel in a bottom of the second cavity, curing the first and second radially innermost skins present in the mold, wherein the first and second soundproof panels are built up against the sidewall of the first cavity and the sidewall of the second cavity, respectively, to form terminal walls of the first and second soundproof panels, each terminal wall forming an angle greater than 0 degrees with a longitudinal axis of the duct of the nacelle, further comprising the steps of:

removing the first and second soundproof panels from the first and second cavities, and bringing the terminal walls of the first and second soundproof panels together.

2. The manufacturing method according to claim 1, wherein between the production step and the curing step, the method includes a step of positioning a honeycomb web on top of each radially inner skin and then a step of positioning an outer panel on top of each honeycomb web.

3. The manufacturing method according to claim 1, further including, after the curing step, a step of positioning a honeycomb web on top of each radially inner skin and then a step of positioning an outer panel on top of each honeycomb web.

4. A powerplant including a nacelle with a duct and two soundproof panels produced using the method according to claim 1.

5. An aircraft including at least one powerplant according to claim 4.

6. A mold for producing two soundproof panels of a nacelle of an aircraft including a duct, in which each soundproof panel includes a radially inner skin for being oriented towards the duct, the mold comprising:

on a single face, a first cavity and a second cavity in which first and second soundproof panels are produced, each of the first and second cavities having a sidewall, wherein the first and second soundproof panels are built up against the sidewall of the first cavity and the sidewall of the second cavity, respectively, to form terminal walls of the first and second soundproof panels, each terminal wall forming an angle greater than 0 degrees with a longitudinal axis of the duct of the nacelle, wherein the terminal walls of the first and second soundproof panels are joined.

7. A method for manufacturing two soundproof panels of a nacelle of an aircraft including a duct, in which each soundproof panel includes a radially inner skin for being oriented towards the duct, the manufacturing method comprising:

supplying a mold having, on a single face, a first cavity and a second cavity in which a first soundproof panel and a second sound proof panel are produced, respectively, for each soundproof panel, each cavity longitudinally delimited by a pair of opposing sidewalls, producing a first radially innermost skin of the first soundproof panel in a bottom of the first cavity by placing a corresponding inner skin wholly within the first cavity and between the pair of opposing sidewalls, producing a second radially innermost skin of the second soundproof panel in a bottom of the second cavity by placing a corresponding inner skin wholly within the second cavity and between the pair of opposing sidewalls, and curing the first and second radially innermost skins present in the mold, wherein the first and second soundproof panels are built up against the opposing sidewalls of the first cavity and the opposing sidewalls of the second cavity, respectively, to form terminal walls of the first and second soundproof panels, each terminal wall forming an angle greater than 0 degrees with a longitudinal axis of the duct of the nacelle, further comprising the steps of:

removing the first and second soundproof panels from the first and second cavities, and bringing the terminal walls of the first and second soundproof panels together.

\* \* \* \* \*